United States Patent
Bradley et al.

(10) Patent No.: US 8,602,333 B2
(45) Date of Patent: Dec. 10, 2013

(54) WOOD CHIPPER INFEED CHUTE

(75) Inventors: Jeffrey D. Bradley, Pella, IA (US); James L. O'Halloran, Pella, IA (US); Edwin N. Galloway, Pella, IA (US); Ivan Brand, Holland, MI (US); Dale J. Messenger, Knoxville, IA (US)

(73) Assignee: Vermeer Manufacturing Company, Pella, IA (US)

(*) Notice: Subject to any disclaimer, the term of this patent is extended or adjusted under 35 U.S.C. 154(b) by 547 days.

(21) Appl. No.: 12/599,662

(22) PCT Filed: May 1, 2008

(86) PCT No.: PCT/US2008/062222
§ 371 (c)(1),
(2), (4) Date: Mar. 31, 2011

(87) PCT Pub. No.: WO2008/140955
PCT Pub. Date: Nov. 20, 2008

(65) Prior Publication Data
US 2011/0192923 A1    Aug. 11, 2011

Related U.S. Application Data

(60) Provisional application No. 60/928,937, filed on May 10, 2007.

(51) Int. Cl.
*B02C 18/22* (2006.01)

(52) U.S. Cl.
USPC .......................................... 241/37.5; 241/92

(58) Field of Classification Search
USPC .................. 241/92, 36, 37.5, 186.2, 186.3
See application file for complete search history.

(56) References Cited

U.S. PATENT DOCUMENTS 3,841,571 A    10/1974    Dankel et al.
4,260,114 A    4/1981    Herder

FOREIGN PATENT DOCUMENTS

BE            1006930 A6    1/1995

*Primary Examiner* — Mark Rosenbaum
(74) *Attorney, Agent, or Firm* — Merchant & Gould P.C.

(57) ABSTRACT

An infeed chute that is configured to more effectively and safely guide brush into a chipper is provided. The infeed chute is configured to guide brush upwards, thereby minimizing the occurrence of branches inadvertently catching the bottom edge of the chute. The infeed chute is also configured so that operators can conveniently load the chipper while being along a side of the chipper.

16 Claims, 5 Drawing Sheets

WOOD CHIPPER INFEED CHUTE

This application is a National Stage Application of PCT/US2008/062222, filed May 1, 2008, in the name of Vermeer Manufacturing Company, a U.S. national corporation, applicant for the designation of all countries except the U.S., and Jeffrey D. Bradley, James L. O'Halloran, Edwin N. Galloway, Ivan Brand and Dale Messenger, citizens of the U.S., applicants for the designation of the U.S. only, and claims priority to U.S. Provisional Patent Application Ser. No. 60/928,937, filed May 10, 2007, and which applications are incorporated herein by reference. To the extent appropriate, a claim of priority is made to each of the above disclosed applications.

FIELD OF THE INVENTION

The present invention relates generally to chipper devices and, more specifically, the infeed chute of a chipper.

BACKGROUND OF THE INVENTION

Chippers are used to reduce branches, trees, brush, and other bulk wood products into small wood chips. A chipper typically includes an infeed chute, a feed system for controlling the feed rate of wood products into the chipper, a chipping mechanism, a drive system for powering the feed system and the chipping mechanism, and a discharge chute. The infeed chute cooperates with the feed system to guide the wood products towards the chipping mechanism.

Through the operation of the feed system, products to be chipped are brought into contact with the chipping mechanism, which grinds, flails, or cuts the wood products into small pieces. These chips are propelled into the discharge chute and expelled from the chipper. Chippers, if operated incorrectly, are potentially dangerous devices. The chipping mechanism typically rotates at high speeds, producing the high torque necessary to chip the wood products. The feed system typically includes infeed rollers which grab and pull material to be chipped into the chipper. As the rollers pull the material, it is possible that the material may catch an operator's clothing pulling the operator toward the infeed chute. A recent improvement to chipper infeed systems is described in U.S. Pat. No. 7,044,409 to Stelter which is incorporated herein by reference, including a stop member that is positioned where an operator can conveniently actuate a stop control causing the feed rollers to stop. This control is positioned where branches can also actuate the stop control, causing undesirable stoppage of the feed rollers. There is a need for an infeed that minimizes undesirable stoppage of the feed rollers.

SUMMARY OF THE INVENTION

The present disclosure relates to an infeed chute that is configured to make it easier for operators to load the chippers. The infeed chute of the present disclosure is configured such that an operator can conveniently operate the chipper from a position in front of and behind the leading edge of the infeed and also along the side of the infeed. In one embodiment the side portions of the infeed are angled such that the upper edge of the infeed is substantially closer to the chipping mechanism than is the lower leading edge, and the sides are also flared outwardly and tapered inwardly.

The infeed chute of one embodiment of the present disclosure is further beneficial to the operation of the chipper by lifting branches as they are pulled into the chipper, which tends to reduce the frequency of undesirable stoppage of the infeed caused by unintended activation of the stop control located at the chipper infeed.

DETAILED DESCRIPTION OF THE PREFERRED EMBODIMENT

Figure 1:
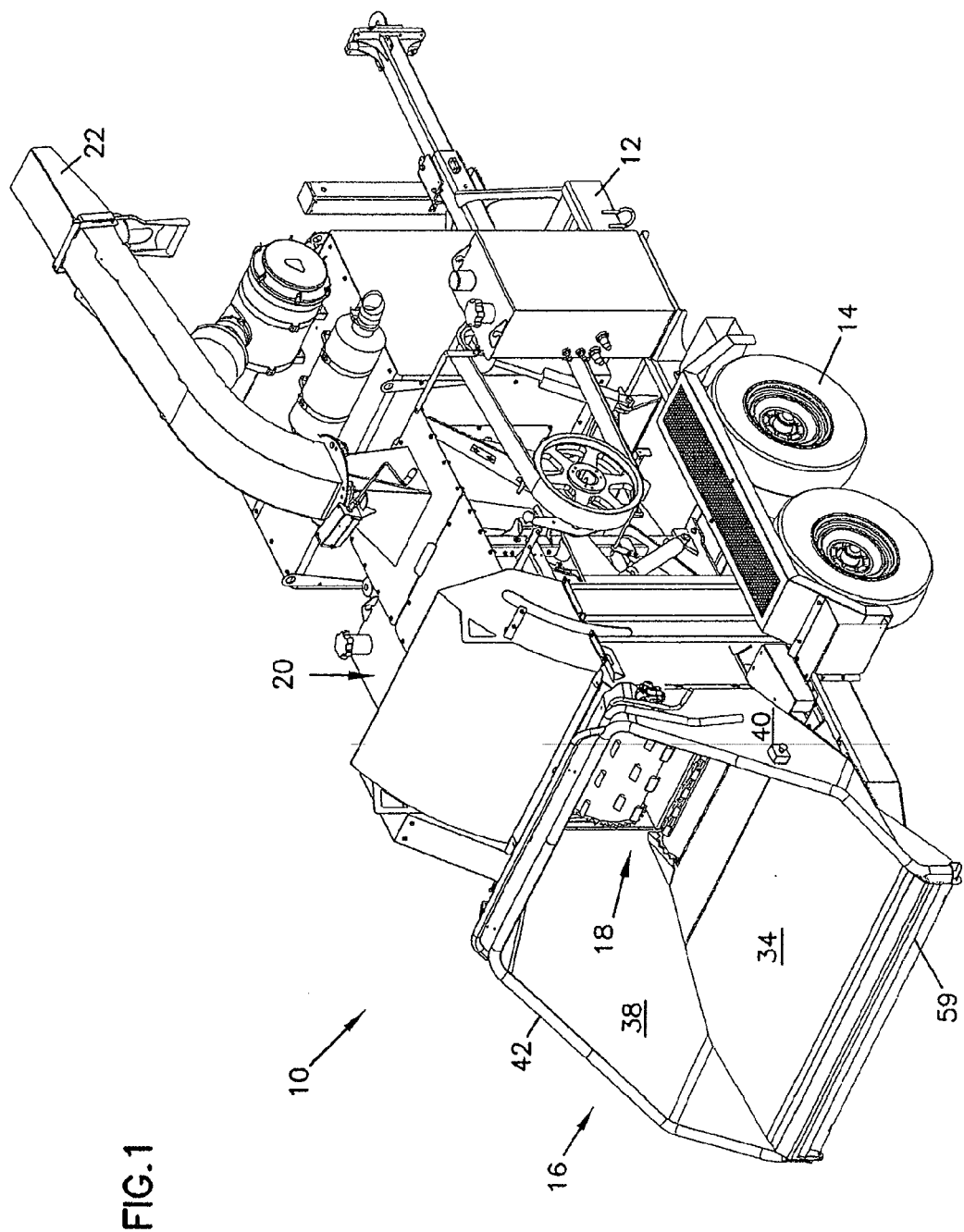
FIG. 1 is a perspective view of a chipper according to the principles of the present invention.
Figure 4:
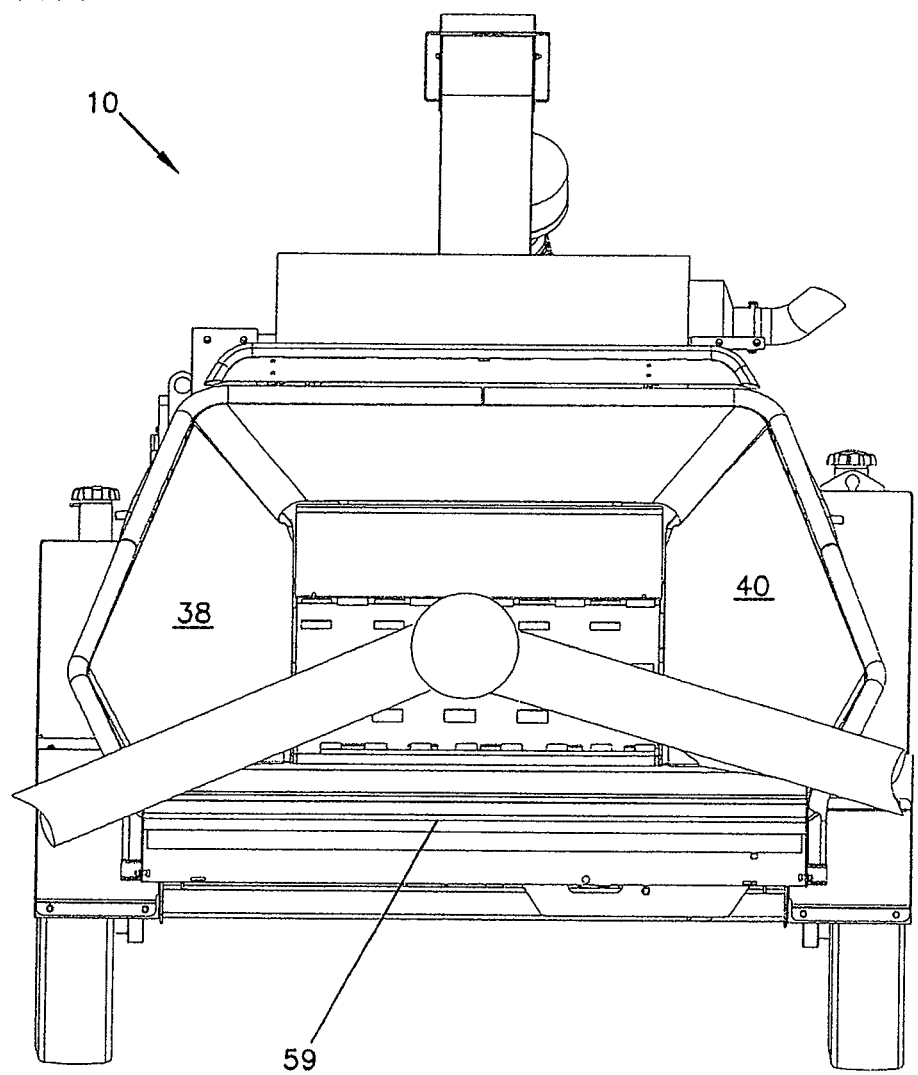
FIG. 4 is a rear end view of the chipper of FIG. 1 with a log diagrammatical shown therein.
Figure 5:
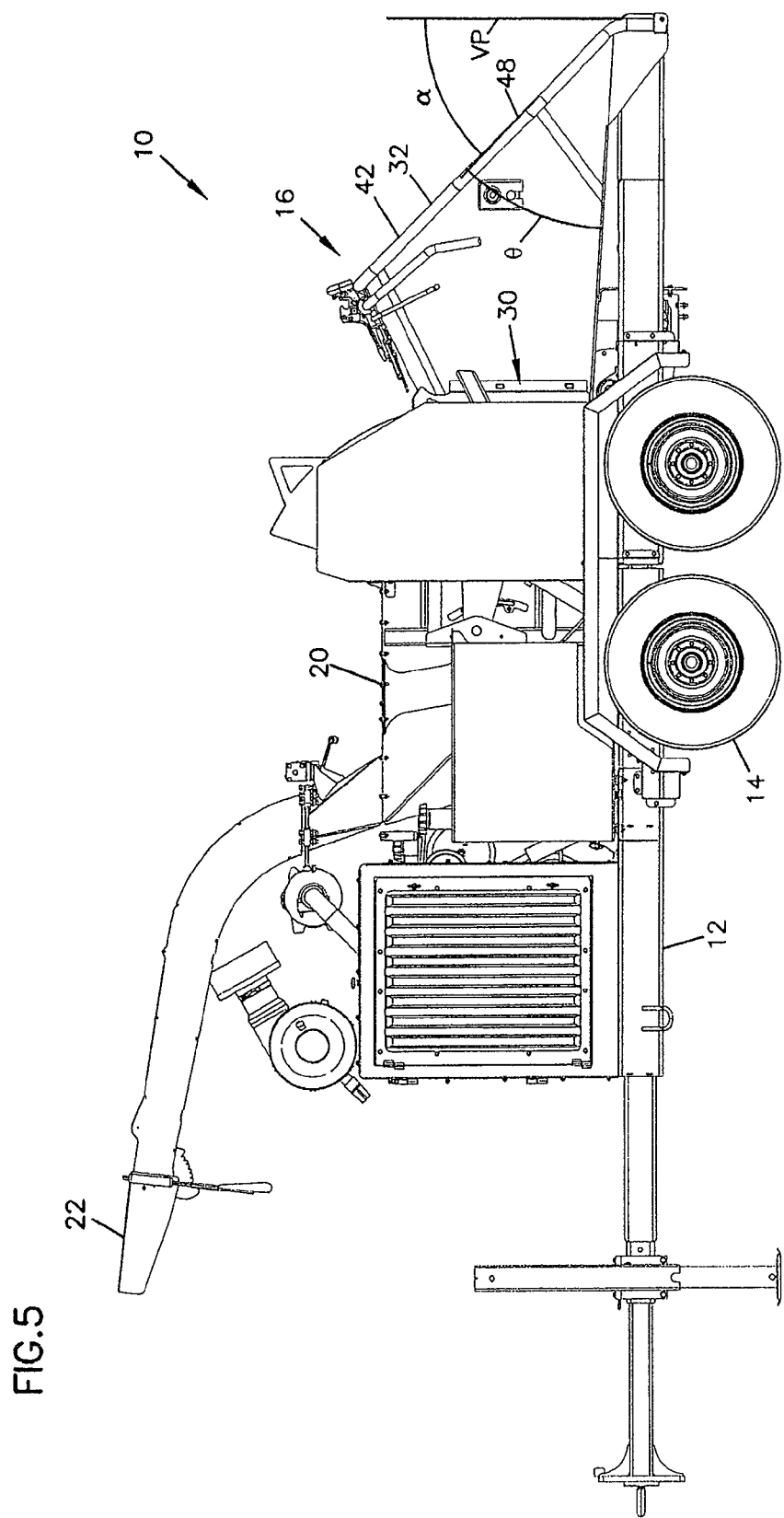
FIG. 5 is a side view of the chipper of FIG. 1.

Referring to FIGS. 1 and 4, a perspective view and a side view of a chipper are shown. In the depicted embodiment the chipper 10 is mounted to a frame 12 that rests on wheels 14, which enable the chipper 10 to be conveniently moved. The depicted chipper 10 includes a feed chute 16, which is also commonly referred to as a feed table, at the rear of the chipper 10 that facilitates the loading of materials to be chipped into the chipper 10. (The material to be chipped can be any material that the user desires to reduce to chips. The material is most commonly brush and tree parts, therefore, for convenience the material to be chipped will be referred to herein as wood, trees, or brush. Also the words wood, trees, or brush are used interchangeably.) The chipper 10 in the depicted embodiment includes a pair of feed rollers 18 that grab and pull brush from the feed chute 16 into the body portion 20 of the chipper 10 which houses cutters (not shown) that cut the brush into small chips. The chips are then projected out of the chipper 10 through a discharge chute 22.

A detailed description of the feed rollers 18 is provided in a related application filed on May 10, 2007 titled WOOD CHIPPER FEED ROLLER, which is incorporated by reference herein. Likewise, a detailed description of the cutters within the body portion 20 is provided in a related application filed on May 10, 2007 titled CHIPPER DRUM WITH INTEGRAL BLOWER, which is also incorporated herein by reference.

Referring to FIGS. 1-5, the configuration of the feed chute 16 is described in greater detail below. The feed chute 16 is constructed to funnel brush into the feed rollers 18. The funneling function is in part accomplished because the opening at the end adjacent to the feed rollers, referred to herein as the second end 30, is smaller in area than the opening at the opposite end, referred to herein as the first end 32. In the depicted embodiment the area of the opening at the first end 32 is more than twice as large as the area of the opening at the second end 30. The relative size difference between the openings is partially a result of the bottom surface 34 being longer than the top surface 36. In the depicted embodiment, the walls of the chute 16 angle towards the feed rollers 18. While in use, the walls of the chute guide and can also compress the brush as the feed rollers 18 pull brush into the chipper 10.

In the depicted embodiment the chute 16 includes a bottom surface 34, a top surface 36, a first side surface 38, and a second side surface 40. The edges of the surfaces define a periphery edge 42 of the first end 32 of the chute 16. In the depicted embodiment the top portion 44 of the periphery edge 42 is positioned relatively closer to the body portion 20 than the bottom portion 46 of the periphery edge 42. The side portions 48, 50 include upper portions 56, 58 and lower portions 52, 54 which are aligned when the chipper is viewed from the side. The sides 48 and 50 are at an angle α (see FIG. 4) with respect to a vertical plane VP that is perpendicular to the longitudinal axis of the chipper 10.

The angle α is preferably greater than 20 degrees and more preferably between 30 to 60 degrees. In the depicted embodiment the angle α is about 45 degrees. The angle α can have an effect on where the operator can stand relative to the feed rollers 18 while he or she loads brush and other materials into the chipper 10. In addition, the angle α enables the chipper to have a large opening at its first end 32 for receiving brush while at the same time still making it very difficult for operators to get into a position where they are in danger of being injured by the feed rollers. In the depicted embodiment the bottom surface 34 slopes downwardly from the second end 30 to the first end 32. The periphery edge 42 and the bottom surface 34 are at an angle θ relative to each other. The angle θ is preferably less than 80 degrees and more preferably between 60 to 30 degrees.

Figure 2:
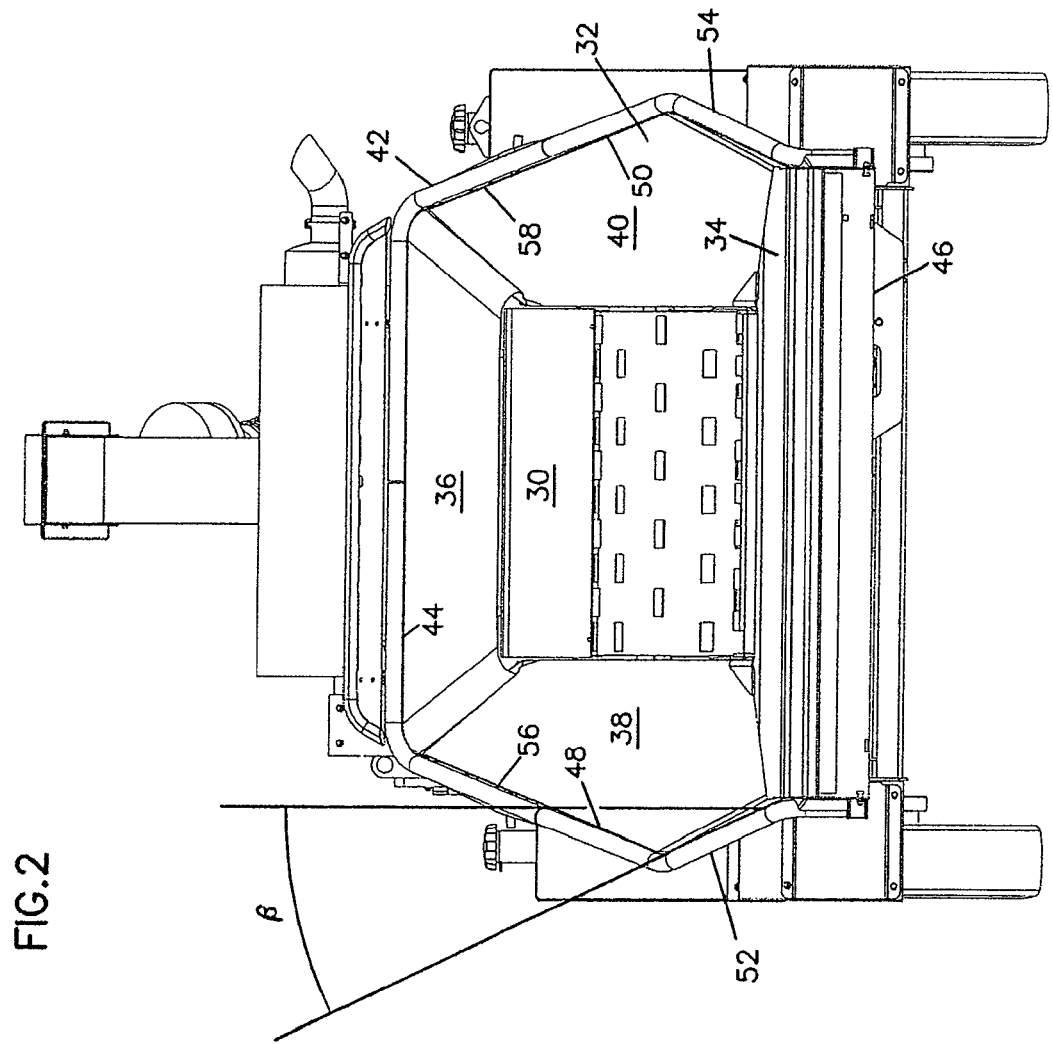
FIG. 2 is a rear end view of the chipper of FIG. 1.

The side portions 48, 50 of the periphery edge 42 of the chute 16 include lower portions 52, 54 that flare outwardly from the bottom surface 34 of the chute 16. From a rear end view, the lower portions 52, 54 extend at an angle β from a vertical plane parallel to the longitudinal axis of the chipper 10. Preferably, the angle β is between 10 to 60 degrees. In the depicted embodiment the angle β is between 15 to 30 degrees. As shown in FIG. 2, the bottom surface 34 is generally parallel to the ground; therefore, the lower portions 52, 54 extend at an angle β plus 90 relative to the bottom surface. The lower portions 52, 54 guide and center the brush as it is pulled into the feed rollers 18. The lower portions 52, 54 support branches as they are pulled by the feed rollers 18 upwards away from the bottom portion 46 of the periphery edge 42, decreasing the number of times the feed rollers 18 stop due to branches contacting an emergency stop 59 located on the bottom portion 46 of the periphery edge 42 (see FIG. 4). The emergency stop 59 is intended to stop the feed rollers 18 when engaged by an operator either intentionally or accidentally.

Figure 3:
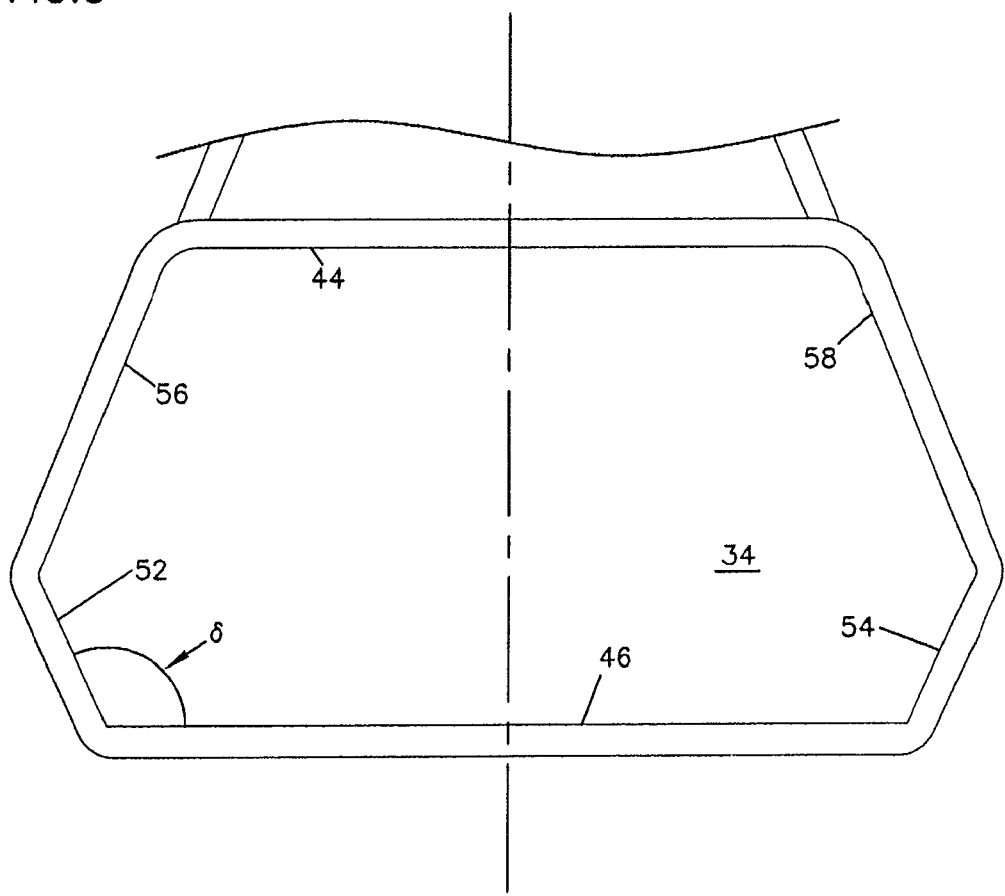
FIG. 3 is a top view of a portion of the chipper of FIG. 1 with parts removed for clarity.

The lower portions 52, 54 also enable operators to more easily load the chipper 10 while standing along a side of the chipper 10. If the lower portions 52, 54 were not flared, but instead were aligned with the upper portions 56, 58, operators might not be able to move alongside the chute 16 as conveniently. In addition, the angle of the lower portions 52, 54, if engaged by the operator, would direct the operator away from the feed rollers 18. Referring to FIG. 3, a top view of the chute 16 is shown. The lower portions 52, 54 are at an angle δ relative to the bottom portion 46 of the periphery edge 42. The angle δ is preferably between 90-135 degrees. In the depicted embodiment angle δ is about 115 degrees.

In the depicted embodiment, the upper portions 56, 58 of the side portions 48, 50 taper inwardly towards the top portion 44 of the periphery edge 42 of the chute 16. The taper of the upper portions enables operators while at the side of the chipper to safely guide brush into the feed rollers. In view of the disclosure above, the chute 16 in the depicted embodiment is configured to facilitate loading of the chipper 10.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A chipper comprising:
    an infeed roller configured to engage and pull material to be chipped into the chipper;
    a chute including:
        a first end adjacent the infeed roller configured to guide materials to be chipped towards the infeed roller;
        a second end opposite the first end configured to receive the material to be chipped, the second end including:
        a pair of opposed side members that each include an upper portion having an upper periphery edge and a lower portion having a lower periphery edge;
        a bottom surface extending between the first end and the second end of the chute,
        wherein the lower periphery edges extend upwardly from the bottom surface at an angle between 30-60 degrees relative to the bottom surface,
        wherein the upper periphery edges taper inward toward a top surface, and
        wherein the lower periphery edges and the upper periphery edges are aligned when the chipper is viewed from the side.

2. The chipper according to claim 1, wherein the top surface extends between the first end and the second end of the chute.

3. The chipper according to claim 2, wherein a distance between the pair of opposed side members is greater than the width of the top surface and also greater than the width of the bottom surface.

4. The chipper according to claim 1, wherein the lower portions of the side members are configured to direct the material to be chipped in a direction away from the bottom surface.

5. The chipper according to claim 1, wherein the upper periphery edges and the lower periphery edges are each at an angle between 40 to 60 degrees relative to a vertical plane that is perpendicular to the longitudinal axis of the chipper.

6. The chipper according to claim 5, wherein the upper periphery edges and the lower periphery edges are each at an angle between 40 to 50 degrees relative to a vertical plane that is perpendicular to the longitudinal axis of the chipper.

7. The chipper according to claim 1, wherein the bottom surface extends away from the feed rollers a distance that is at least twice as long as the distance that a top surface of the chute extends from the feed rollers.

8. The chipper according to claim 1, wherein the lower periphery edges extend outwardly at an angle 100-150 degrees relative to the bottom surface.

9. The chipper according to claim 1, wherein the lower portions extend outwardly from the bottom surface such that the lower periphery edges of the lower portions when viewed from above the chipper are each at an angle between 95-135 degrees relative to a periphery edge of the bottom surface of the chute.

10. A chipper infeed chute comprising:
    a first end defining a first opening, the opening including a bottom edge, a top edge, and opposed side edges;
    a second end defining a second opening, the second opening being larger in area than the first opening and including a bottom edge, a top edge, and opposed side edges, the opposed side edges each including an upper portion and a lower portion, the respective upper portions tapering inwardly toward the top edge of the second opening, the respective lower portions flare outwardly relative to the bottom edge of the second opening, the respective upper and lower portions of the opposed side edges being aligned when the chipper infeed chute is viewed from the side;
    a top surface extending between the top edge of the first opening and the top edge of the second opening;

a bottom surface extending between the bottom edge of the first opening and the bottom edge of the second opening, wherein the bottom surface is longer than the top surface; and a pair of side walls extending between the side edges of the first opening and the side edges of the second opening;

wherein the side walls flare outwardly such that the maximum width of the second opening is greater than the width of the bottom edge of the second opening.

11. The chipper infeed chute of claim 10, wherein the bottom edge of the second opening is wider than a top edge of the second opening.

12. The chipper infeed chute of claim 10, wherein the flare is between 100 to 120 degrees outwardly relative to the bottom surface.

13. The chipper infeed chute of claim 10, wherein the area of the second opening is at least twice as large as the area of the first opening.

14. A chipper infeed chute comprising:

a top surface, a bottom surface, and a first and a second side wall that define a first and a second opening, wherein the second opening is larger than the first opening;

wherein the second opening is positioned at an angle between 40 to 60 degrees relative to the bottom surface;

wherein the first and second side walls include side edges, the side edges having lower portions and upper portions;

wherein a portion of the lower portions is angled upward and outward relative to the bottom surface;

wherein a portion of the upper portions taper inward toward the top surface; and wherein the respective upper and lower portions of the opposed side edges are aligned when the chipper infeed chute is viewed from the side.

15. The chipper infeed chute of claim 14, wherein a portion of the lower portions is angled at between 30 to 60 degrees upward and outward relative to the bottom surface.

16. The chipper infeed chute of claim 14, wherein periphery edges of the lower portions when viewed from above the chipper are each at an angle between 95-135 degrees relative to a periphery edge of the bottom surface.

* * * * *